United States Patent Office

Re. 24,681
Reissued Aug. 18, 1959

24,681

LITHIUM BASE GREASE

Richard A. Butcosk, Uniondale, N.Y., assignor to Socony Mobil Oil Company, Inc., a corporation of New York No Drawing. Original No. 2,842,493, dated July 8, 1958, Serial No. 623,290, November 20, 1956. Application for reissue February 25, 1959, Serial No. 795,572

12 Claims. (Cl. 252—36)

Matter enclosed in heavy brackets [ ] appears in the original patent but forms no part of this reissue specification; matter printed in italics indicates the additions made by reissue.

This invention has to do with greases characterized by a high order of effectiveness over a wide range of operating conditions. More specifically, the invention is related to lithium base lubricating grease compositions which possess outstanding mechanical stability when worked in the presence of excess water, and which possess outstanding storage and service stability.

This application is a continuation-in-part of my copending application Serial No. 409,760, filed February 11, 1954, which has been abandoned.

In recent years, a demand has been created for greases of outstanding lubricating character which retain their grease structure during use over a wide range of operating conditions. For example, there has been an increasing demand for water-resistant greases by the military and by such industries as steel mills, paper mills and food canning. Until recently, lithium stearate greases have been sufficiently water-resistant to meet specifications announced by the military and industry. Now, however, specifications have been made more stringent in order that exellent lubricating performance be assured in service.

Lithium stearate greases have been designated as water-resistant or water-repellent, in accordance with their evaluation in the water washout test (Specification ANG-5a) and the water-resistant test (Specification O.S. 1350). A more severe water test, more recently announced, is that involving admixture of 10% of water with the grease and working the resulting mixture in a motor-matic worker for 100,000 double strokes. This test is fully described in the Military Specification MIL-G-10924, Amendment 2. Conventional types of lithium soap greases particularly lithium stearate greases, work to a semi-fluid condition in this latter test. A number of steps have been taken to increase the water resistance of such greases. For example, free fat, such as high titer animal tallow, has been incorporated in the grease for this purpose. This approach appears to be disadvantageous or deleterious in other respects in that the fat is unstable and generally decomposes into fatty acids and glycerin, such that the grease eventually softens in storage and also in service. Other additives, such as zinc naphthenate and zinc resinate, have been used in greases to improve the water-resistance characteristics, but they, too, soften with water.

It is an object of this invention, therefore, to proivde a grease which retains its original character over a wide range of operating conditions. A primary object of the invention is to provide a grease composition characterized by excellent mechanical stability of lubricating quality and of grease-like structure, when worked in the presence of excess water. Another important object is the provision of a grease composition having excellent storage and service stability. Other objects of the invention will be apparent from the following description.

These and other objects have been realized by formation of new and novel lithium base compositions, which contain mixtures of lithium soaps in which the acid components of the soaps comprise balanced proportions of wool grease fatty acids and the aliphatic acids having at least about 12 carbon atoms per molecule, and which also contain relatively small amounts of calcium, strontium, barium and/or zinc soaps of said acids.

In my aforementioned application, Serial No. 409,760, I stated that I had found that calcium soaps, when present in the lithium greases described therein, destroyed the water-resistance of such greases. Recently, I found that lesser quantities of calcium soaps imparted further improvement, rather than impaired, the lithium greases. Investigating further the effect of calcium soaps, I repeated my earlier work which is set forth in said application and was surprised to find that calcium soaps did not destroy the water-resistance feature. It is now clear that the lithium-calcium greases prepared earlier were faulty. It appears that the latter had not been properly prepared, particularly with respect to insufficient dehydration traceable to the use of lower temperatures than those which would lead to satisfactory dehydration.

Wool grease fatty acids are well known in the art. For example, they have been described in detail by E. S. Lower in the Industrial Chemist, in the March, May and October issues of 1947. As defined in the aforesaid publication, wool grease fatty acids ". . . are those fatty acids which are obtained when the soap solutions obtained in the manufacture of lanolin are acidified, may be extremely pale in color, or may be very dark to almost black, and may be nearly free from odour or have a strong acidic smell. They range from soft, limpid compositions to hard, wax-like materials, the latter usually being a paler product."

As further explained in the aforesaid publication, "Wool grease fatty acids are composed, generally speaking, of the fatty acids obtained from the scouring liquids used in washing the wool in textile mills, and also the natural free wool wax acids and neutral saponifiable matter. They may also contain, depending upon the care taken in their manufacture and finish, traces of undecomposed soap from the manufacture of wool wax, and also traces of water soluble salts, mainly sodium sulfate, and also even traces of free sulfuric acid used in the decomposition of the above-mentioned soap."

Physical characteristics of wool grease fatty acids, and of a typical wool grease fatty acid product, are illustrated below in the following tabulation:

PHYSICAL CHARACTERISTICS OF WOOL GREASE FATTY ACIDS

| | Range | Typical |
|---|---|---|
| Moisture ... percent | 1–5 | 2 |
| Unsaponifiable ... do | 3–7 | 5 |
| Saponifiable ... do | 70–98 | 95 |
| Free Fatty Acids, as Oleic ... do | 70–95 | 84 |
| Free Neutral Fat ... do | 0–5 | None |
| Saponification Value | 120–190 | 170 |
| Iodine Value | 20–50 | 25–34 |
| Titer ... ° C | 40–45 | 40–43 |

The above tabulation is descriptive particularly of wool grease fatty acids as produced in the United Kingdom. More recently in the U.S.A., with the advent of the recovery of lanolin alcohols and cholesterol from degras, wool grease fatty acids of somewhat different physical and chemical characteristics are available, and are a preferred material.

U.S.A. WOOL GREASE FATTY ACIDS RECOVERED AS A BY-PRODUCT OF LANOLIN ALCOHOLS AND CHOLESTEROL MANUFACTURE

| | |
|---|---|
| Acid number | 105–125 |
| Saponification number | 140–165 |
| Iodine number (Hanus) | 10–20 |
| Titer, ° C | 50–53 |
| Acetyl Number | 45–75 |
| Water, percent | 1–3 |
| Ash, percent | 0.2–0.6 |

As indicated above, the lithium soaps of this invention, used in conjunction with the lithium soaps of wool grease fatty acids, are soaps of aliphatic acids having at least about 12 carbon atoms per molecule. Representative of such acids are stearic acid, hydroxy stearic acids such as 12-hydroxy stearic acids, oleic acid, palmitic acid, hydroxy palmitic acids, myristic acid, hydroxy myristic acid, and the like. It is also to be understood that fatty materials containing substantial proportions of the foregoing acids can also be used herein. Typical of such materials are vegetable, animal and fish fatty oils, and hydrogenated fatty materials thereof, such as stearin, hydrogenated tallow fatty acids, hydrogenated soya bean fatty acids, hydrogenated fish oils and partial hydrogenated marine, vegetable, and animal oils. Preferred herein, together with the wool grease fatty acids, are stearic acid and palmitic acid, and myristic acid. A particularly outstanding grease is obtained with balanced proportions of wool grease fatty acids, stearic acid and hydroxy stearic acid.

One of the most critical relationships involved in the formation of the lithium base greases of this invention, is the balanced proportion of the lithium soap acid components. It has been found that the desired water-resistant characteristic is obtained only by using from about 15 percent by weight to about 80 percent by weight of wool grease fatty acids, with the remainder of the acid components comprising aliphatic acids of the character described above. Outstanding grease compositions are obtained when the balance of acid components comprises from about 25 percent by weight to about 50 percent by weight of wool grease fatty acids, with the remainder being the aforesaid aliphatic acids. For example, when lithium soaps of wool grease fatty acids are totally absent from corresponding lithium base grease compositions, the latter have unsatisfactory water-resistant characteristics. Even when the lithium soaps of wool grease fatty acids are present in combination with other lithium soaps, such as lithium stearate, but in inadequate proportion, the resulting compositions are found to be satisfactory. Such a grease composition is one wherein the lithium soaps of wool grease fatty acids represent less about 15 percent by weight of total fatty acid content. Another feature to be noted is a grease containing only lithium soaps of wool grease fatty acids, is inferior to greases of this invention; that is, such a grease sets up in prolonged storage or in other words, the grease becomes much firmer in consistency such that it fails to lubricate properly when used.

The finished greases of this invention can be somewhat acidic, somewhat basic in reaction or can be neutral. That is, the finished greases can contain acid equivalent to as much as 0.5 percent by weight of oleic acid, or can contain alkali equivalent to as much as 0.2 percent by weight of lithium hydroxide.

As indicated above, the lithium grease compositions of this invention also contain small, but critical, quantities of calcium, strontium, barium and/or zinc soaps. When calcium soaps are used, the mole ratio of lithium (Li) to calcium (Ca) should be between about 27:1 and about [6:1] *4:1*, with preference being given to mole ratios within the range of 14:1 to 9.5:1. When strontium soaps are used, the mole ratio of lithium (Li) to strontium (Sr) should be from about 42:1 to about 2.8:1; preference is given to mole ratios ranging from 14:1 to 4.7:1. Correspondingly, with mixtures of lithium (Li) and zinc (Zn) soaps, the mole ratios are from about 30:1 to 5:1, preferably from 15:1 to 7.5:1. When barium soaps are used, the mole ratio of lithium (Li) to barium (Ba) should be from about 33:1 to about 3:1; preference is given to mole ratios ranging from 16:1 to 13:1. And in the same vein, when two, three or all four of the soaps of the metals calcium, strontium, barium and zinc are used, the mole ratios of these metals related to the mole ratios of lithium will be between about 14:1 and about 4.7:1.

The total quantity of soaps is also balanced in order to provide greases of the desired character. The soaps comprise from about 5 to about 30 percent (by weight) of the finished greases, and preferably from about 7 to about 20 percent.

Inasmuch as methods for the preparation of lithium, calcium, trontium, barium and zinc soaps, and greases containing the same, are well known in the art, discussion of the same is believed to be unnecessary here. It is to be understood, however, that preformed soaps can be incorporated in oil to make the greases; and that the soaps can be formed in situ. Illustrative examples, however, are furnished hereinbelow as a guide.

It will be understood also that a variety of lithium, calcium, strontium, barium and zinc compounds can be used in preparing the soaps present in the new grease compositions. For example, lithium compounds such as the hydroxide, carbonate and hydride can be used. Generally, however, lithium hydroxide is preferred. Typical of the calcium compounds useful herein are the hydroxide, oxide and carbonate, with the hydroxide being preferred. Typical of the strontium compounds suitable for use are the carbonate and the hydroxide octahydrate, the latter being preferred. Representative of the barium compounds are the hydroxide and hydroxide octahydrate, the latter—$Ba(OH)_2.8H_2O$—being preferred. Similarly, the following zinc compounds can be used: oxide, carbonate and stearate (pre-formed); the last mentioned is preferred.

The mineral oil constituent of the greases of this invention can be of varied character. The oil constituent is characterized by a viscosity (SUV) of greater than one second at 100° F., and generally from about 60 to about 6000 seconds at 100° F. The oil may be of naphthenic or of paraffinic character. Typical oils are a naphthenic mineral oil, having a SUV of 70 seconds at 100° F., and a solvent-refined, naphthenic oil having a SUV of 80 seconds at 100° F.

As indicated above, grease compositions of this invention can be prepared from pre-formed soaps, or the soaps can be made in situ in a grease-forming base of the character described above. It will be clear that when the soaps are prepared in situ by a procedure such as that illustrated below, there will be formed a mixture of wool grease fatty acid soaps and of the aforesaid aliphatic acid or acids, with the metals used being distributed between the said acids. When a mixture of lithium and calcium soaps are desired, then the resulting mixture will comprise: lithium wool grease fatty acid soaps, a lithium soap or soaps of the aliphatic acid or acids, calcium wool grease fatty acid soaps and a calcium soap or soaps of the aliphatic acid or acids. Correspondingly, when the mixture to be formed is one of lithium and barium, or lithium and strontium, or lithium and zinc soaps, the distribution of soaps will correspond to that in the case of lithium and calcium mentioned directly above.

A typical procedure for preparing the greases is given in the following illustrative examples.

EXAMPLE I.—LITHIUM-CALCIUM GREASE

All of the fatty materials, wool grease fatty acids and, for example, hydrogenated tallow fatty acids, and 30–40 percent of the total mineral oil, are charged to a suitable grease kettle. The resulting mixture is heated to about 140–160° F., and then the required proportion of lithium hydroxide monohydrate dissolved in water, is added. This is followed by addition of a water rinse. Next, the dry $Ca(OH)_2$ is added. After this, the mixture so obtained is heated to 380–390 ° F., over a period of one to three hours. At this point, the balance of mineral oil used in preparing the grease compositions, is added, and the total mass is reheated to 390–400° F. for a period of one to two hours. The resulting liquid product is withdrawn from the grease kettle into pans for cooling to room temperature (70–80° F.), which cooling generally requires two to ten hours. The cooled blocks of grease, which are so obtained, are milled to a buttery product of the desired penetration.

EXAMPLE II.—LITHIUM-STRONTIUM GREASE

The procedure for preparing a lithium-strontium grease is much the same as that given in Example I. However, in this instance, the lithium and strontium hydroxides are dissolved in water and are added at the same stage of the preparation. Thus, there is no addition of a dry hydroxide, as when $Ca(OH)_2$ was used.

cone penetration is made. The value so obtained is taken as the initial penetration. A fresh sample of the grease (unworked) is placed in another crucible (of the same size), and the crucible is stored in an oven at 160° F. for three days. At the end of the three-day period, the latter crucible is removed from the oven and is cooled to 77° F. A ½ scale cone penetration value is determined for the sample so stored. The amount (percent) of hardening of the grease under these accelerated conditions is calculated as:

$$\text{Percent hardening} = \frac{(\text{initial-final})\ \tfrac{1}{2}\text{ cone penetration}}{\text{initial }\tfrac{1}{2}\text{ cone penetration}} \times 100$$

Correlation of the "percent hardening" value with actual field storage conditions provides the following scale:

| | |
|---|---|
| 40% and higher | Excessive hardening in 3–12 months' storage. |
| 31–40% | Fair. |
| 15–30% | Excellent to good. |

Results of the tests conducted with typical greases of this invention are given in Table I below.

Table I

PHYSICAL CHARACTERISTICS OF GREASES MADE FROM LITHIUM MIXED WITH OTHER METAL SOAPS

| Soaps | Lithium Barium | Lithium Zinc | Lithium Strontium | Lithium Calcium | Lithium Calcium Strontium |
|---|---|---|---|---|---|
| Mole Ratio Lithium to other metal | 16:1 | 15:1 | 14:1 | 14:1 | 14:1 |
| Wool Grease Fatty Acids, Percent | 3.00 | 3.00 | 3.00 | 3.00 | 3.00 |
| Stearic Acid, Percent | 8.00 | 8.00 | 8.00 | 8.00 | 8.00 |
| Mineral Oil 500 SUS at 100° F. Solvent Ref., Percent | 87.0 | 85.8 | 86.68 | 87.2 | 86.68 |
| Lithium Hydroxide ($LiOH.H_2O$), Percent | 1.60 | 1.60 | 1.60 | 1.60 | 1.60 |
| Barium Hydroxide ($Ba(OH)_2$), Percent | 0.40 | | | | |
| Strontium Hydroxide ($Sr(OH)_2.8H_2O$), Percent | | | 0.72 | | 0.72 |
| Lime Flour ($Ca(OH)_2$), Percent | | | | 0.2 | 0.20 |
| Zinc Stearate, Percent | | 1.6 | | | |
| Penetration Unworked/Worked | 256/277 | 259/283 | 253/292 | 268/288 | 280/300 |
| 50,000×1/16" (Dry) Worker Test | 337 | 375 | 281 | 307 | 305 |
| 100,000×¼" With 10% $H_2O$ | 342 | 361 | 335 | 340 | 362 |
| Accelerated Oven Test, 3 Days at 160° F.: $\frac{60\times\frac{1}{2}\text{ Cone Pen.}-\text{Stored }\frac{1}{2}\text{ Cone Pen.}}{60\times\frac{1}{2}\text{ Cone Pen.}}\times 100=\text{percent}$ | 32 | 22 | 29 | 19 | 29 |
| ASTM Dropping Point, ° F | 370 | 357 | 418 | 370 | 370 |
| CRC Free Water Corrosion (14 Days—Distilled Water) | | Pass | Pass | Pass | Pass |

EXAMPLE III.—LITHIUM-BARIUM GREASE

Preparation of a lithium-barium grease is carried out in the same manner as given in Example II for a lithium-strontium grease.

EXAMPLE IV.—LITHIUM-ZINC GREASE

The procedure for a lithium-zinc grease is the same as for a lithium-calcium grease, with the following change: the $LiOH.H_2O$ is dissolved in water and the zinc stearate is added immediately thereafter.

Grease compositions of this invention have been subjected to several tests in order to determine their character in storage and in service under conditions simulating those encountered during their use.

One such test involves working the greases with ten percent by weight of water, in a motor-matic worker for 100,000 double strokes. This test is a measure of the mechanical stability of the grease upon exposure to water, and is described in Military Specification MIL–G–10924, Amendment 2.

Another test measures the effectiveness of the grease in preventing corrosion of metal parts to which the grease is applied. This is the CRC free water corrosion test which is described in Military Specification MIL–G–25013A. The test, 4.3.2.2 to 4.3.2.2.4 is known as bearing protection test.

A third test used herein measures the stability of the grease under severe storage conditions. This is the accelerated oven test. In this test, a 60× worked sample is placed in a #0 Coors, low form, crucible. A ½ scale The results shown in Table I indicate that firm lithium grease compositions, with satisfactory storage stability, can be prepared from wool grease fatty acids and stearic acid, and from a combination of lithium and a metal from Group II of Mendeleeff's Periodic Table, the metal having an atomic weight from 40 to 137. All of the greases have excellent resistance to shear break down in the wet as well as dry conditions. It is to be noted, too, that all of the greases have high melting points, above 350° F. From a consideration of all results, the lithium-calcium grease is considered to be outstanding.

Additional greases of the character contemplated herein are shown below in Table II. Here, the oil vehicle is of lower viscosity than that shown in Table I. Again, the grease compositions are of excellent character.

Table II

| | | |
|---|---|---|
| *Mole Ratio Lithium to Calcium* | *4:1* | *14:1* |
| Wool Grease Fatty Acids, Percent | 3.85 | 3.85 |
| Stearic Acid (Hydrogenated Tallow F.A.), Percent | 8.00 | 8.00 |
| $LiOH.H_2O$, Percent | 1.25 | 1.59 |
| Lime Flour, Percent | 0.50 | 0.20 |
| Mineral Oil 100 SUS at 100° F (Solvent Ref.), Percent | 86.40 | 86.36 |
| Penetration Unworked/Worked | 265/272 | 276/282 |
| 50,000×1/16" Dry Worker Test | 259 | 240 |
| 100,000×¼" With 10% $H_2O$ | 288 | 271 |
| Accelerated Storage, 4 Days at 160° F., Percent Hardening | 36 | 29 |
| ASTM Dropping Point, ° F | 324 | 357 |

As indicated above, grease compositions of the type contemplated herein can be prepared with preformed soaps. Conventional procedures can be used when making use of the preformed soaps. The illustrative grease compositions shown below were prepared in the following manner. The wool grease fatty acid soap was mixed with about thirty percent (by weight) of the total mineral oil; the mixture was heated to about 400° F., and the resultant mixture was cooled. The conventional aliphatic acid soap (i.e., the stearate) was mixed with about thirty percent of the total mineral oil; this mixture was heated and cooled in like manner. The two soap mixtures were then combined with each other and with the remainder of the oils; the resulting mixture was heated to about 400° F. The final product was cooled to 70–80° F. and, when so cooled, was milled to a product of the desired penetration. Grease compositions so prepared are shown in Table III below:

Table III

PREFORMED SOAPS

| | | |
|---|---|---|
| *Mole Ratio Lithium to Calcium* | *6:1* | *7:1* |
| Soaps: | | |
| Lithium Stearate, Percent | 8.1 | ---------- |
| Lithium Soaps of Wool Grease Fatty Acids, Percent | ---------- | 8.9 |
| Calcium Stearate, Percent | ---------- | 2.3 |
| Calcium Soaps of Wool Grease Fatty Acids, Percent | 3.1 | ---------- |
| Penetration, Unworked/Worked | 319/329 | 249/281 |
| 50,000×1/16" Dry Worker Test | 332 | 349 |
| 100,000×1/4" With 10% Water | 370 | 327 |
| Accelerated Storage, 3 Days at 160° F., Percent Hardening | 18 | 33 |
| ASTM Dropping, Point, °F | 360 | 328 |

The results provided in Table III reveal that the two greases are of excellent character. Outstanding in regard to storage stability is the grease comprising lithium stearate and calcium soaps of wool grease fatty acids; the "percent hardening" value is only 18.

It is to be understood that the greases of this invention can also contain other characterizing materials. For example, the greases can contain grease antioxidants such as amines, phenols, sulfides, etc., and lubricity improving agents such as free fat, free fatty acids, esters of alkyl and/or aryl acids, sulfurized fats, lead soaps, etc. These characterizing materials do not detract from the lubricating value of the grease contemplated herein; rather, these characterizing materials serve to impart their customary properties to the grease. The amount of such additives which can be added to grease compositions of this invention is around about 0.01 percent to less than 10 percent by weight, and preferably 0.1 to 5.0 percent by weight.

Greases of this invention are applicable for general automotive uses, and are excellent aircraft greases, industrial greases and the like.

I claim:

1. A lubricating grease comprising: a major proportion of mineral oil and a minor proportion, sufficient to form a grease, of a mixture of soaps, the acid components of said soaps comprising from about fifteen percent by weight to about eighty percent by weight of wool grease fatty acids and the balance of said acid components comprising aliphatic acids having at least about twelve carbon atoms per molecule, one of the metal components of said soaps being lithium and at least one other metal component of said soaps being selected from the group consisting of calcium, strontium, barium and zinc, with the mole ratio of lithium (Li) to calcium (Ca) being between about 27:1 and about [6:1] *4:1*, the mole ratio of lithium (Li) to strontium (Sr) being between about 42:1 and about 2.8:1, the mole ratio of lithium (Li) to barium (Ba) being between about 33:1 and about 3:1, and the mole ratio of lithium (Li) to zinc (Zn) being between about 30:1 and about 5:1.

2. A grease defined by claim 1 wherein the wool grease fatty acids comprise from about twenty-five percent by weight to about fifty percent by weight of the total acid components.

3. A grease defined by claim 1, wherein the aliphatic acid is stearic acid.

4. A grease defined by claim 1 wherein the aliphatic acid is hydroxy-stearic acid.

5. A grease defined by claim 1 wherein the aliphatic acids comprise a mixture of stearic acid and hydroxy-stearic acid.

6. A grease defined by claim 1 wherein the proportion of said mixture of soaps is from about 5 to about 30 percent by weight of the grease.

7. A lubricating grease comprising a major proportion of mineral oil and a minor proportion, sufficient to form a grease, of a mixture of lithium stearate and calcium soaps of wool grease fatty acids wherein the wool grease fatty acids component of the calcium soaps comprises from about 25 percent by weight to about 50 percent by weight of the total acid components of the said lithium soap and said calcium soaps, and wherein the mole ratio of lithium to calcium is within the range of from about 27:1 to about [6:1] *4:1*.

8. A lubricating grease comprising a major proportion of mineral oil and a minor proportion, sufficient to form a grease, of a mixture of lithium stearate and calcium soaps of wool grease fatty acids wherein the wool grease fatty acids component of the calcium soaps comprises from about 25 percent by weight to about 50 percent by weight of the total acid components of the said lithium soap and said calcium soaps, and wherein the mole ratio of lithium to calcium is within the range of from about 14:1 to about 9.5:1.

9. A lubricating grease comprising a major proportion of mineral oil and a minor proportion, sufficient to form a grease, of a mixture of lithium and zinc soaps, the acid components of said soaps comprising about one-third by weight of wool grease fatty acids and about two-thirds by weight of stearic acid, and the mole ratio of lithium to zinc being about 15:1.

10. A lubricating grease comprising a major proportion of mineral oil and a minor proportion, sufficient to form a grease, of a mixture of lithium and strontium soaps, the acid components of said soaps comprising about one-third by weight of wool grease fatty acids and about two-thirds by weight of stearic acid, and the mole ratio of lithium to strontium being about 14:1.

11. A lubricating grease comprising a major proportion of mineral oil and a minor proportion, sufficient to form a grease, of a mixture of lithium and barium soaps, the acid components of said soaps comprising about one-third by weight of wool grease fatty acids and about two-thirds by weight of stearic acid, and the mole ratio of lithium to barium being about 16:1.

12. A lubricating grease comprising a major proportion of mineral oil and a minor proportion, sufficient to form a grease, of a mixture of lithium, calcium and strontium soaps, the acid components of said soaps comprising about one-third by weight of wool grease fatty acids and about two-thirds by weight of stearic acid, the mole ratio of lithium to calcium being about 14:1 and the mole ratio of lithium to strontium being about 14:1.

References Cited in the file of this patent or the original patent

UNITED STATES PATENTS 2,676,149 Woods et al. ---------- Apr. 20, 1954

FOREIGN PATENTS 550,429 Great Britain ---------- Jan. 7, 1943

OTHER REFERENCES

Wool Wax, D. T. C. Gillespie, Hobart Pub. Co., Washington, D.C., 1948, pp. 55 and 56.